(12) United States Patent
Kemp

(10) Patent No.: US 10,146,864 B2
(45) Date of Patent: Dec. 4, 2018

(54) SYSTEMS AND METHODS FOR VALIDATION OF CITED AUTHORITY

(75) Inventor: Richard Douglas Kemp, Atlantic City, NJ (US)

(73) Assignee: THE BUREAU OF NATIONAL AFFAIRS, INC., Arlington, VA (US)

(*) Notice: Subject to any disclaimer, the term of this patent is extended or adjusted under 35 U.S.C. 154(b) by 250 days.

(21) Appl. No.: 12/709,042

(22) Filed: Feb. 19, 2010

(65) Prior Publication Data

US 2011/0208769 A1    Aug. 25, 2011

(51) Int. Cl.
*G06F 17/30* (2006.01)
*G06Q 50/18* (2012.01)

(52) U.S. Cl.
CPC ....... *G06F 17/30728* (2013.01); *G06Q 50/18* (2013.01)

(58) Field of Classification Search
USPC .......................................................... 707/769
See application file for complete search history.

(56) References Cited

U.S. PATENT DOCUMENTS

| | | | | |
|---|---|---|---|---|
| 7,814,102 B2* | 10/2010 | Miller | | 707/736 |
| 8,032,820 B1* | 10/2011 | Wolfe | | 715/205 |
| 2005/0149343 A1* | 7/2005 | Rhoads | | G06Q 10/10 |
| | | | | 705/311 |
| 2005/0203924 A1* | 9/2005 | Rosenberg | | 707/100 |
| 2006/0041608 A1* | 2/2006 | Miller | | G06F 17/30722 |
| 2006/0149720 A1* | 7/2006 | Dehlinger | | 707/3 |
| 2006/0248440 A1* | 11/2006 | Rhoads et al. | | 715/500 |
| 2008/0015885 A1* | 1/2008 | Bennett | | G06F 17/30637 |
| | | | | 705/311 |
| 2008/0086680 A1* | 4/2008 | Beckman | | 715/230 |
| 2009/0112859 A1* | 4/2009 | Dehlinger | | 707/6 |
| 2009/0292673 A1* | 11/2009 | Carroll | | 707/3 |
| 2010/0005388 A1* | 1/2010 | Haschart et al. | | 715/256 |
| 2010/0114911 A1* | 5/2010 | Al-Kofahi | | G06F 17/30707 |
| | | | | 707/748 |
| 2010/0318509 A1* | 12/2010 | McBeath et al. | | 707/713 |

* cited by examiner

*Primary Examiner* — Christopher J Raab
(74) *Attorney, Agent, or Firm* — Chiesa Shahinian & Giantomasi PC

(57) ABSTRACT

Embodiments of the invention relate to systems and methods for obtaining and/or organizing information related to documents cited in a source document. For example, a legal brief may cite authority, such as judicial opinions, in support of the arguments in the brief. Embodiments of the invention relate to automatic identification in a document of citations to authority and preparation of information related to the cited authorities. For example, in an embodiment of the invention, a report may comprise normalized expressions of one or more legal principles asserted in one or more cited opinions and information associated with the ongoing vitality of one or more the legal principles, the cited authority, or both.

15 Claims, 8 Drawing Sheets

Federal Bankruptcy Law
Automatic Stay
Violation of Stay
Remedies
⌒ 310

300

Points of Law

LAW & HOLDINGS | CASE EXTRACTS   370
326

93087.1 ACTIONS TAKEN IN VIOLATION OF THE AUTOMATIC STAY PROVISIONS OF THE BANKRUPTCY CODE ARE VOID   314, 322
                                                           366                                                              305

1) *Kalb v. Feurstein*, 308 U.S. 433, 60 S. Ct. 343, 84 L. Ed. 370 (1940)
330, 362   ⊙ The Federal Bankruptcy filing deprived the Wisconsin County Court of the power and jurisdiction to maintain foreclosure
            proceedings.   342  346  350  354  358

2) *Bustamante v. Cueva*, 371 F.3d 232 (5th Cir. 2004)
330   ⊙ Post petition foreclosure sale was not one of the class of transactions which allows the bankruptcy trustee to avoid   305, 318
  338      because the sale had been retroactively validated by the court.   374

93087.2 ACTIONS TAKEN IN VIOLATION OF THE AUTOMATIC STAY PROVISIONS OF THE BANKRUPTCY CODE ARE VOIDABLE

1) *Chapman v. Bituminous Insurance Co.*, 345 F.3d 338 (5th Cir. 2003)
    ⊙ Bankruptcy filing and discharge of debt or did not affect the liability of a general liability insurer to pay a judgment on a
       personal injury claim and any violations of the automatic stay were merely voidable.
  330

402 VERIZON COMMUNICATIONS INC v. LAW
OFFICES OF CURTIS v. TRINKO LLP
Opinion of the Court

I

Petitioner Verizon Communications Inc. is the incumbent local exchange carrier (LEC) serving New York State. Before the 1996 Act, Verizon,[1] like other incumbent LECs enjoyed an exclusive franchise within its local service area. The 1996 Act sought to "uproo[t]" the incumbent LECs' monopoly and to introduce competition in its place. *Verizon Communications Inc. v. FCC*, 535 U.S. 467, 488 (2002). Central to the scheme of the Act is the incumbent LEC's obligation under 47 U.S.C. §251(c) to share its network with competitors, see *AT&T Corp. v. Iowa Utilities Bd.*, 525 U.S. 366, 371 (1999), including provision of access to individual elements of the network on an "unbundled" basis. §251(c)(3). New entrants, so-called competitive LECs, resell these unbundled network elements (UNEs), recombined with each other or with elements belonging to the LECs.

Verizon, like other incumbent LECs, has taken two significant steps within the Act's framework in the direction of increased competition. First, Verizon has signed interconnection agreements with rivals such as AT&T, as it is obligated to do under §252, detailing the terms on which it will make its network elements available. (Because Verizon and AT&T could not agree on terms, the open issues were subjected to compulsory arbitration under §§252(b) and (c).) In 1997, the state regulator, New York's Public Service Commission (PSC) approved Verizon's interconnection agreement with AT&T.

Second, Verizon has taken advantage of the opportunity provided by the 1996 Act for incumbent LECs to enter the long-distance market (from which they had long been excluded). That required Verizon to satisfy, among other things, a 14-item checklist of statutory requirements, which

---

[1] In 1996, NYNEX was the incumbent LEC for New York State. NYNEX subsequently merged with Bell Atlantic Corporation, and the merged entity retained the Bell Atlantic name; a further merger produced Verizon. We use "Verizon" to refer to NYNEX and Bell Atlantic as well.

550

II. Legal Arguments

A.    The License Agreement at issue is unambiguous, and protects information held by RevTech as trade secrets and communicated to Voss during the course of the parties' License Agreement, but does not preclude Voss from using information that came to it independently from third parties.

Article 12.12 of the License Agreement (also referred to as the "Agreement") provides that the Agreement shall be construed pursuant to the laws of New York. The Agreement is integrated. See Joint Exhibit ("Exh.") 1, Article 12.07. The following rules of interpretation apply: "[W]here the language of the contract is unambiguous, and reasonable persons could not differ as to its meaning, the question of interpretation is one of law to be answered by the court." *Norwest Financial, Inc. v. Fernandez*, 1999 U.S. Dist. LEXIS 16022, (S.D.N.Y. Oct. 18, 1999) (quoting *Rothenberg v. Lincoln Farm Camp, Inc.*, 755 F.2d 1017, 1019 (2d Cir. 1985)); *Ruttenberg v. Davidge Data Sys. Corp.*, 626 N.Y.S. 2d 174, 175 (N.Y. App. Div. 1995). An interpretation of a contract that has the effect of rendering one clause superfluous or meaningless or that is not consistent with the Agreement as a whole, is to be avoided. *Ruttenberg*, 215 A.D.2d at 196; *LaSalle*

Legal Analysis Report          580

Citation References

1)    1999 US Dist. LEXIS 16022

592          588      *Citation Not Found*                        584

2)    ☑ Rothenberg v. Lincoln Farm Camp, Inc., 755 F.2d 1017 (2d Cir. 1985)

Citation Analysis

- 118 Positive Citing References            596    600
- 1 Distinguished Citing Reference 612          608

Points of Law Analysis

BL POL xxxxx Where language of the contract is unambiguous, and reasonable
persons could not differ as to its meaning, the question of interpretation is one of law to     604
be answered by the court.
Lead Case   ➕   Heller & Hemretig, Inc. v. 3620-168th Street, Inc., 302 N.Y. 326, 98
N.E.2d 458 (1951)

616

POL Strength

| | | |
|---|---|---|
| Recent Citation History Lead Case | Strong | [2007] |
| Lifetime Citation History of Lead Case | Good | [35 Cases] |
| Recent Citation History of POL | Good | [1999] |
| Lifetime Citation History of POL | Fair | [4 Cases] |
| Appellate Court Adoption of POL | Yes | |
| Negative Treatment of Underlying Cases | No | |
| Breadth of Adoption of POL | Fair | [2 States; 1 Federal Court] |
| Federal Circuit Split in POL | No | |
| State Differences in POL | No | |
| New POL | No | |

SYSTEMS AND METHODS FOR VALIDATION OF CITED AUTHORITY

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records but otherwise reserves all copyrights whatsoever.

BACKGROUND

Assertions in a document may be associated with one or more citations to other documents, e.g., as authorities intended to support the respective assertions they are associated with. It may be desirable, however, to provide tools to help judge whether the cited documents do in fact support the associated assertions. Moreover, in some fields, the strength of support that a cited document may provide may change over time; for example, legal authority may be overruled or otherwise altered. It may therefore be desirable to determine the continued vitality of the cited document as support for some or all of the propositions that it may have asserted.

BRIEF SUMMARY OF THE INVENTION

Embodiments of the invention relate to systems and methods for obtaining and/or organizing information related to documents cited in a source document. The invention may be illustrated in connection with embodiments related to legal practice, but any discussion herein of one or more embodiments of the invention related to the practice of law is intended to be purely illustrative and not limiting in any way.

For example, in an embodiment of the invention, citations to legal authorities, such as, e.g., judicial opinions, may be identified in a source document. From the citations, the cited authorities may be identified. In an embodiment of the invention, information about some or all of the cited authorities may be retrieved, organized, and output, e.g., to a user. In an embodiment of the invention, the information may include, for example, information related to the legal principles for which each cited authority may stand and/or the relative strength of the authorities as support for the continued vitality of the respective legal principles stated therein.

In an embodiment of the invention, a computer system is provided for providing information related to references cited in a source document. The computer system in such an embodiment may comprise one or more processors, a memory operatively coupled to at least one of the processors, an interface operatively coupled to at least one of the processors, a database operatively coupled to at least one of the processors, and a computer-readable storage medium, operatively coupled to at least one of the processors.

The computer-readable storage medium may be encoded with instructions that, when executed by at least one of the processors, cause the computer system at least to store the source document in the memory, identify in the source document a citation to a cited document, retrieve from the database at least one normalized expression of a previously identified principle stated in the cited document, and output through the interface a report comprising the normalized expression and indicia that the normalized expression relates to the cited document.

In an embodiment of the invention, the instructions may comprise instructions that, when executed by at least one of the processors, cause the computer system at least to store in the memory strength information representing an evaluation of the normalized expression, wherein the report comprises the strength information, which is associated in the report with the normalized expression.

BRIEF DESCRIPTION OF THE DRAWINGS

FIG. 3 is a schematic of a screen display that includes Points of Law according to an embodiment of the invention.

FIG. 5 is an excerpt of a legal document such as may be processed in connection with an embodiment of the invention.

FIG. 7 is an excerpt from a legal brief such as may be processed in connection with an embodiment of the invention.

FIG. 8 is an excerpt from a report according to an embodiment of the invention.

DETAILED DESCRIPTION OF PREFERRED EMBODIMENTS

Figure 1:
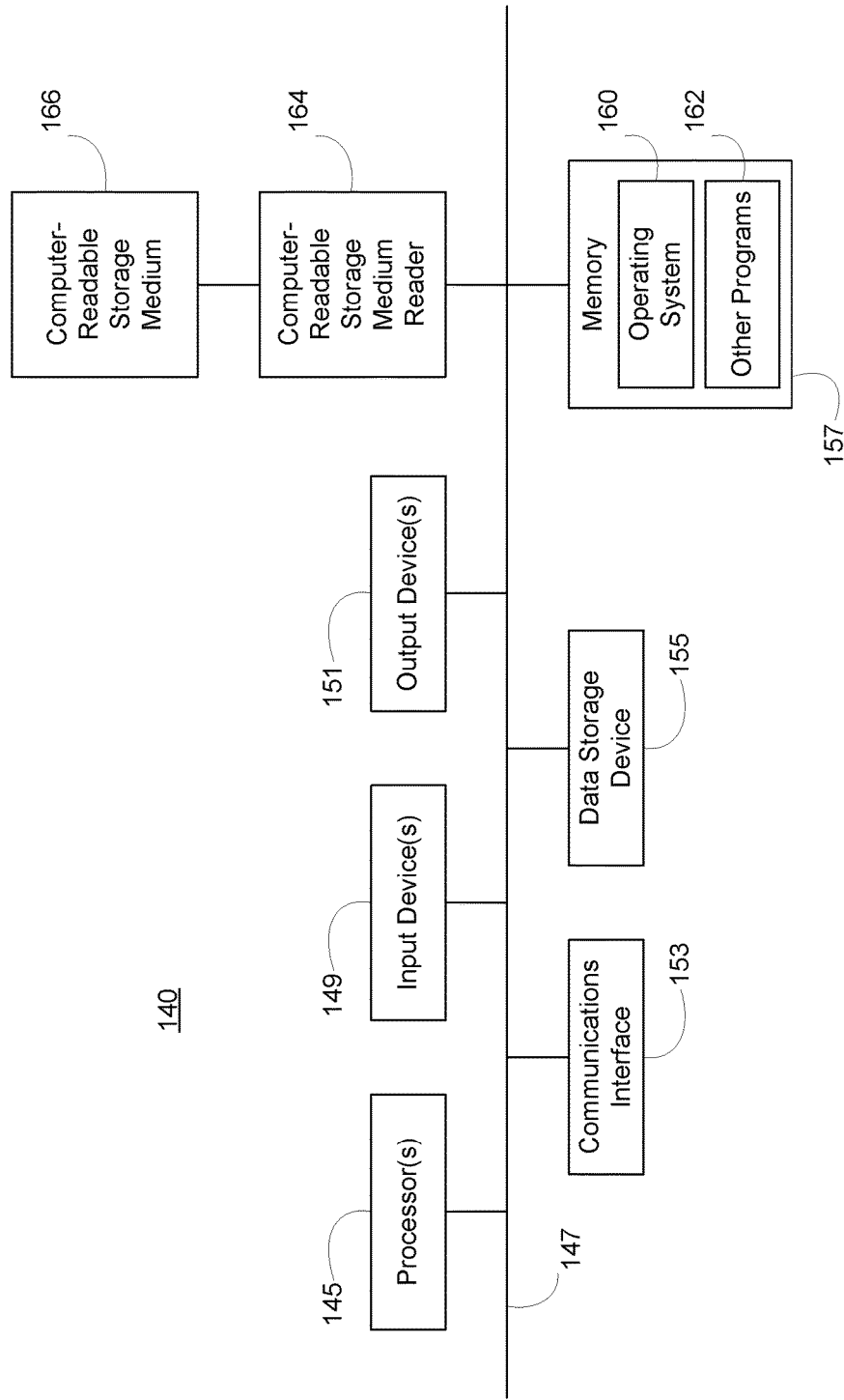
FIG. 1 is a block diagram of a computer system.

Writers sometimes refer to other documents to support their own assertions, arguments, or both. In law, for example, a brief or other writing may refer to an authority as a source of applicable law. Some or all of those references may be citations, e.g., to authorities that may support the writer's positions.

Judicial opinions may be legal authority. An opinion may express one or more conclusions of law that may be related to a court's action, and each conclusion may be referred to as a "holding." An opinion may be cited as mandatory or persuasive authority based on one or more of the holdings expressed in the opinion, but may also be cited for other statements, which may be called "dicta."

(An opinion may sometimes be referred to as a "case" or a "decision," although that terminology may not be strictly correct.)

An opinion, which may explain, e.g., the court's reasoning, may be written by a judge of the court that took the action. If the action is taken by a court or panel that includes more than one judge, one of the participating judges may be selected to write the opinion. The judge who writes an opinion may phrase holdings idiosyncratically, even when expressing a well-established legal principle.

Opinions may vary, e.g., in the kind and/or strength of support that they provide. For example, precedent may be considered mandatory or persuasive authority. "Mandatory authority" may refer to precedent that must be followed in a jurisdiction if it is applicable to the facts. For example, a holding of the Supreme Court of the United States is mandatory authority in all other courts in the United States.

"Persuasive authority," in contrast, may mean authority that may not necessarily be controlling but that may suggest, e.g., a legal principle that might be appropriate to apply. For example, a holding of a United States District Court in one case may not be binding authority in any other case in any court, but it may be cited in an attempt to persuade the court to adopt the previous holding, e.g., by providing a rationale in support of the holding.

Mandatory authority in one jurisdiction may be only persuasive authority in another. For example, the Court of Appeals is the highest court in the judicial system in the State of New York, and its legal holdings are binding on all other New York State courts. Those holdings may not generally be binding in any other state, but may still be cited before a court in another state, e.g., in an attempt to persuade that court if no binding precedent controls the result in a particular case.

An opinion may be a public record, but it may be published, if at all, by one or more private publishers in publications that may be called "reporters." Publication may be electronic, in printed form, or both.

A publisher may provide editorial content associated with a published opinion. One well-known kind of editorial enhancement, which may be referred to as a "headnote," may be a summary of a holding in the opinion. An opinion may state more than one legal principle, and a single publication of an opinion may accordingly include multiple headnotes.

Each headnote that is associated with an opinion may be written individually for that opinion, e.g., by an editor. The author of a headnote may adopt or adapt the phrasing used in the opinion or may independently create a phrasing, just as the judge writing the opinion may choose the phrasing of the principle in the underlying opinion. It may follow that the same legal principle may be expressed differently from headnote to headnote and opinion to opinion, reflecting the word and phrasing choices, e.g., of multiple judges, editors, or both.

An alternative editorial summary of the legal principles expressed in an opinion, in connection with an embodiment of the invention, may involve normalized expressions of legal principles, which may be associated with opinions and parts of opinions. Such a normalized expression may be referred to herein as a Point of Law, and Points of Law are discussed in detail in related U.S. patent application Ser. No. 11/947,410, filed on 29 Nov. 2007 and titled "Creation And Maintenance of a Synopsis of a Body of Knowledge Using Normalized Terminology," which is incorporated herein by reference.

As described further in that application, in an embodiment of the invention, opinions may be judged respectively to express certain principles of law in a representative manner. The selection criterion or criteria may vary depending on the embodiment of the invention, but may include one or more of, for example, the quality of the writing, the degree to which the phrasing has been quoted elsewhere, and the importance and/or authority of the court. According to this embodiment of the invention, such expressions may then be adopted, as-is or edited, as a standard by a publisher.

A selected standard expression can be taken as setting forth a Point of Law. In connection with an embodiment of the invention, a Point of Law may be created, e.g., for any statement, interpretation, analysis, or standard of law enunciated in an opinion. Other opinions' statements relating to the expressed principle may then be described in terms of the Point of Law. For example, an opinion may be said to accept the Point of Law, to reject it, or simply to discuss it.

It will be appreciated that the selection of standard expressions for reference by a citator may, depending on the body of documents, yield very many such expressions. Indeed, depending again on, e.g., the number, type, and scope of analyzed documents, the collected standard expressions may effectively describe one or more entire fields of law in one or more jurisdictions.

According to an embodiment of the invention, collected Points of Law may be organized within a hierarchy of topics and subtopics. For example, in connection with an embodiment of the invention, a Legal Topic Hierarchy is provided that includes a classification of legal topics which may, e.g., span some or all fields of U.S. law. One example of a Legal Topic Hierarchy, in connection with an embodiment of the invention, may include a classification that includes about 120 broad fields of law (also referred to as "topics"), such as admiralty law, antitrust and trade, constitutional law, corporate law, and securities regulation. Each topic may then be divided into subtopics, each of which may contain further subtopics, and so on. The extent of the outline that the hierarchy represents may vary with, e.g., the particular body of knowledge that is outlined and/or the expected use of the outline. For example, one exemplary Legal Topic Hierarchy may include more than 25,000 topics and subtopics.

Treated as a graph, in which each topic and subtopic is considered a node, the hierarchy is not quite a tree, because some subtopics may be found in several places in the tree. For example, in a Legal Topic Hierarchy, certain subtopics related to the Securities and Exchange Commission might be placed under both administrative law and securities regulation. A structure of this kind may sometimes be called a "polyarchy."

Relationships may be identified between and/or among Points of Law and/or the opinions that express them. For example, different jurisdictions may adopt different, possibly inconsistent, legal principles, which may in an embodiment of the invention be expressed in different Points of Law. The differing legal standards may be identified, e.g., by a human editor, and the relationship between the respective Points of Law may be recorded, in an embodiment of the invention. In connection with such an embodiment, information about the relationship may then be used, e.g., to compare the law in various jurisdictions and/or to identify splits in authority on a particular legal questions.

Another kind of relationship between and/or among Points of Law, in connection with an embodiment of the invention, involves the respective parts of multi-part legal tests. For example, in *Lemon* v. *Kurtzman*, 403 U.S. 602 (1971), the Supreme Court of the United States announced a three-part test concerning the permissibility of government action under the Establishment Clause of the U.S. Constitution: (1) the action must have a secular legislative purpose; (2) it must not have the primary effect of either advancing or inhibiting religion; and (3) it must not result in an "excessive government entanglement" with religion. In an embodiment of the invention, separate Points of Law may correspond to each of the three parts of the *Lemon* test, and a relationship between the three Points of Law may be recorded. In an embodiment of the invention, the record of the relationship may take the form of a Point of Law distinct from those expressing the individual parts of the test, or it may be associated with a Point of Law, or both.

In connection with an embodiment of the invention, individual cases may also be related to one or more Points of Law and/or to each other to form identifiable lines of cases, as described more fully below.

An embodiment of the invention may involve, e.g., storage, retrieval, indexing, and/or other processing of information, which may include, e.g., documents, Points of Law, a Legal Topic Hierarchy, relationships, etc., by one or more programmable digital computers and/or using one or more computer-readable storage media. FIG. 1 is a block diagram of a representative computer system 140 such as may be used in connection with an embodiment of the invention.

The computer system 140 includes at least one processor 145, such as, e.g., an Intel Core™ 2 microprocessor or a Freescale™ PowerPC™ microprocessor, coupled to a communications channel 147. The computer system 140 further includes at least one input device 149 such as, e.g., a keyboard, mouse, touch pad or screen, or other selection, pointing, and/or input device, at least one output device 151 such as, e.g., a CRT or LCD display, a communications interface 153, a data storage device 155, which may comprise, e.g., a magnetic disk, an optical disk, and/or an other computer-readable storage medium, and memory 157 such as Random-Access Memory (RAM), each coupled to the communications channel or bus 147. The communications interface 153 may be coupled to a network 142 such as the Internet.

A person skilled in the art will recognize that a computer system may have multiple channels 112, which may be interconnected. In a configuration comprising multiple interconnected channels, components may be considered to be coupled to one another, despite being directly connected to different communications channels. Additionally, any connection between or among any one or more components may include one or more interfaces.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store instructions executable by one or more processors 145 or kinds of processors, data, or both, which may represent, e.g., one or more operating systems, programs, and/or other data.

Figure 2:
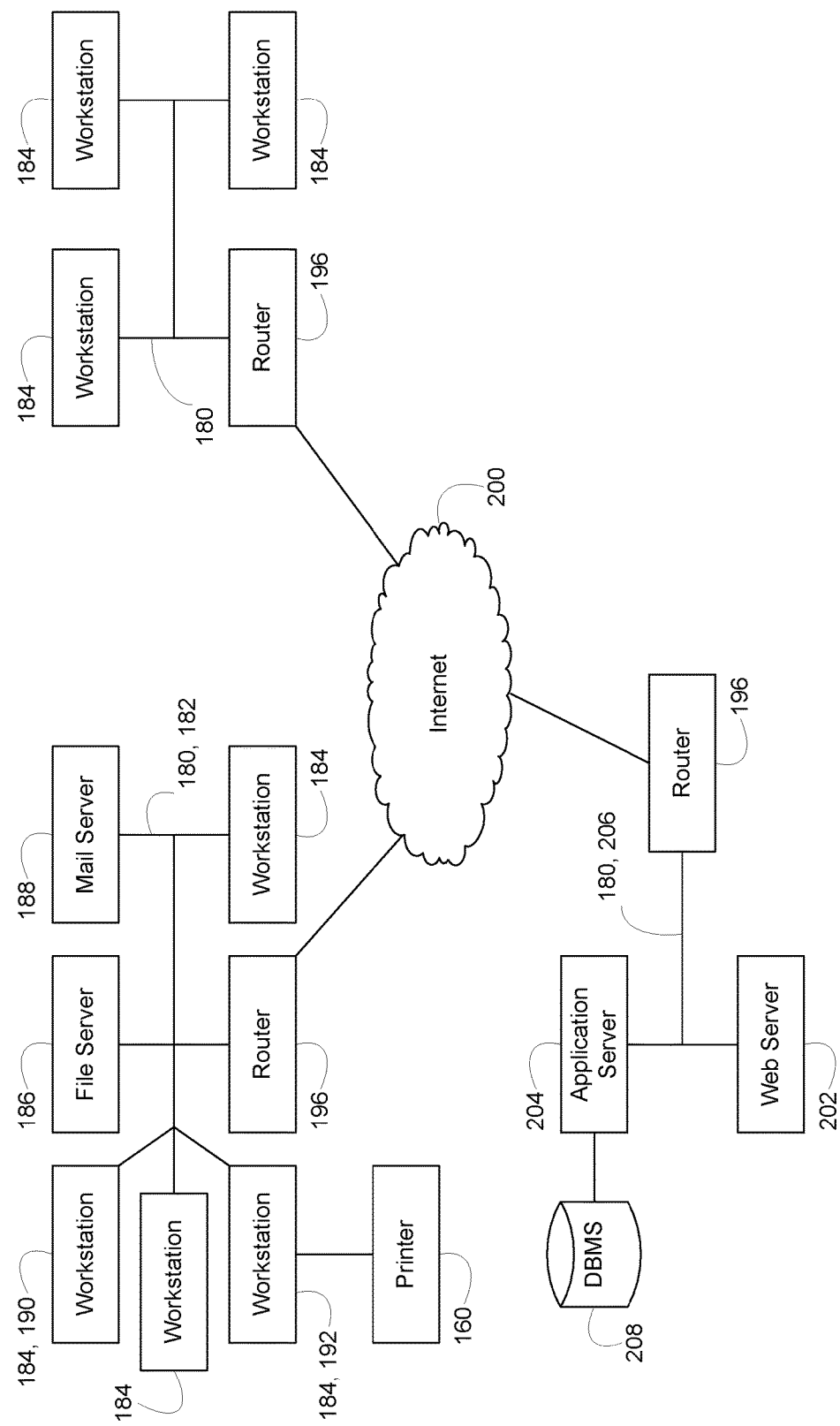
FIG. 2 is a block diagram of networked computer systems.

Two or more computer systems 140 may be connected, e.g., in one or more networks, via, e.g., their respective communications interfaces 155 and/or network interfaces (not depicted). FIG. 2 is a block diagram of representative interconnected networks 180, such as may be useful in connection with embodiments of the invention. A network 182 may, for example, connect one or more workstations 184 with each other and with other computer systems, such as file servers 186 or mail servers 188. The connection may be achieved tangibly, e.g., via optical cables, or wirelessly.

A network 180 may enable a computer system to provide services to other computer systems, consume services provided by other computer systems, or both. For example, a file server 186 may provide common storage of files for one or more of the workstations 184 on a network 182. A workstation 190 may send data including a request for a file to the file server 186 via the network 182 and the file server 186 may respond by sending the data from the file back to the requesting workstation 190.

The terms "workstation," "client," and "server" may be used herein to describe a computer's function in a particular context, but any particular workstation may be indistinguishable in its hardware, configuration, operating system, and/or other software from a client, server, or both. Further, a computer system may simultaneously act as a workstation, a server, and/or a client. For example, as depicted in FIG. 2, a workstation 192 is connected to a printer 194. That workstation 192 may allow users of other workstations on the network 182 to use the printer 194, thereby acting as a print server. At the same time, however, a user may be working at the workstation 192 on a document that is stored on the file server 186.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196.

A network of networks 180 may be referred to as an internet. The term "the Internet" 200 refers to the worldwide network of interconnected, packet-switched data networks that uses the Internet Protocol (IP) to route and transfer data. A client and server on different networks may communicate via the Internet 200. For example, a workstation 190 may request a World Wide Web document from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network 206 or a different one and/or a Database Management System ("DBMS") 208.

The terms "client" and "server" may describe programs and running processes instead of or in addition to their application to computer systems described above. Generally, a (software) client may consume information and/or computational services provided by a (software) server.

In an embodiment of the invention, Points of Law may be stored, retrieved, indexed, and/or otherwise processed and/or made available by and/or through one or more computer systems. For example, FIG. 3 illustrates two Points of Law displayed, e.g., on an electronic display device, according to an embodiment of the invention. As depicted in FIG. 3, the display 300 includes, as Points of Law 305, the different conclusions that have been reached by courts that have addressed the subtopic of "Remedies" 310 for violations of the automatic stay of pending actions that is imposed under federal bankruptcy law. So expressed, those conclusions are that "[a]ctions taken in violation of the automatic stay provisions of the Bankruptcy Code are void" 314 and, alternatively, that "[a]ctions taken in violation of the automatic stay provisions of the Bankruptcy Code are voidable" 318.

The information accompanying any Point of Law 305 may vary, depending, e.g., on the embodiment of the invention. As depicted in FIG. 3, for example, each Point of Law states a legal principle 322 and an index number 326 that may, e.g., uniquely identify the Point of Law 305 within the synopsis. Below each Point of Law 305 and associated with it are one or more references 330 to authorities that advance that point. Each such reference 330 may include, e.g., a citation 334 to the opinion or other authority, which, for a judicial opinion, may include information such as the title of the case 338, a reference 342 to a volume of a reporter 346 and the page number 350 within that volume on which the indexed opinion begins, the court 354 that rendered the opinion, and/or the date 358 of rendering the opinion.

In an embodiment such as FIG. 3 depicts, the index number 326 may be used, e.g., in a keyword search or as a direct reference, to identify and/or retrieve a particular Point of Law. Instead of or in addition to the foregoing, it may be possible in an embodiment to search for Points of Law, e.g., by keyword and/or natural language searching. It may be possible in an embodiment of the invention to restrict such a search, e.g., to Points of Law associated with one or more topics and/or subtopics in a Legal Topic Hierarchy.

For example, as depicted in FIG. 3, a reference 362 is made to the decision of the U.S. Supreme Court in *Kalb* v. *Feuerstein*, which was rendered in 1940, and which may be found within volume 308 of the United States Reports beginning on page 433. The reference includes so-called "parallel citations" 366 to additional reporters in which the opinion has been published. In the embodiment that FIG. 3 depicts, the title 370 of the case is underlined, indicating that the title is a hyperlink to the indexed opinion. In an alternative embodiment, one or more other portions of the reference 362 may be hyperlinks instead of or in addition to the case title, and/or the hyperlinks may be indicated by other means in addition to or instead of underlining.

In the embodiment that FIG. 3 depicts, a reference may include, e.g., a summary and/or rephrasing 374 of the statement or action that relates to the Point of Law 305 associated with the reference 362.

Judicial opinions may themselves cite other authorities, e.g., to support their statements and conclusions. In the process of acquiring and processing a new document, an electronic publisher may review some or all citations in the new document to produce one or more editorial enhancements. For examples, citation indexes (sometimes referred to as citators) are known in the art, and such review of a newly-acquired document may help the publisher to keep a citation index up to date.

A citation may be associated with other data as part of the review. For example, the proposition that the citation is meant to support may be identified as an expression of a Point of Law according to an embodiment of the invention. The Point of Law may in turn be associated with one or more topics, e.g., in a legal topic hierarchy such as described above. Once one or more such Points of Law and/or associated topics have been identified, their association with the citing document and the citation may in an embodiment of the invention be recorded, e.g., in one or more indexes and/or databases.

In addition to or instead of the foregoing, the citation may be directly associated with one more such topics, independent of any association with any Point or Points of Law.

Also in addition to or instead of the foregoing, in connection with an embodiment of the invention, the citing document's treatment of the cited document may, e.g., be characterized by an editor, and that characterization may be recorded. For example, a judicial opinion may, in citing another decision, follow the cited precedent, criticize it, or distinguish the matter before the court from that addressed in the cited decision. And an appropriate court may overrule one or more holdings of the cited precedent.

Thus, in an embodiment of the invention, a citation may be coded, e.g., according to the respective Point or Points of Law that the citation is meant to support, one or more topics, and/or the citing document's treatment of the cited document. One or more embodiments of the invention may refer to such coding. For example, commonly-owned U.S. patent application Ser. No. 11/412,315, filed 26 Apr. 2008 and titled "System and Method for Topical Document Searching," describes the use of references between documents to define a searchable subset of a collection of documents. (Application Ser. No. 11/412,315 is incorporated herein by reference.) In an embodiment of the invention, a user may select one or more Points of Law, one or more topics, and/or one or more treatments, and definition of the subset may be restricted, e.g., to use only references coded according to the selected Points, topics, and/or treatments.

The coding of one or more citations by Point of Law and/or topic may have other applications. For example, in an embodiment of the invention, a chain of citations, each coded to the same Point of Law, may be followed, e.g., back in time, possibly leading to the first opinion to articulate a version of that particular Point. The chain that leads to that first opinion may, in connection with an embodiment of the invention, be referred to as a line of cases or decisions, although, regarded from the identified first opinion, the collection of citing documents may more closely resemble, e.g., a tree.

In an embodiment of the invention, the line (or tree) of cases may be treated as a collection of documents for one or more purposes. For example, a search (such as a keyword search) may be performed to find matching opinions in the collection. The search may be further restricted in an embodiment of the invention, e.g., by court, jurisdiction, region, industry, and/or other criteria.

It will be appreciated that, in connection with one or more Points of Law, it may not be possible to identify a first opinion that is a single origin for all chains of citations associated with a Point of Law. For example, certain legal principles may have been established centuries ago and may have been generally known to the law in one or more jurisdictions. In such circumstances, among others, multiple chains of cases establishing a single Point of Law may lead back to multiple, independent opinions that each assert, without citing precedent, a version of the substantive principle embodied in the Point of Law.

In an embodiment of the invention, a line of cases expressing a Point of Law, identified, e.g., as above, may be used to designate one or more cases as "lead cases" associated with that Point of Law. Sometimes in an embodiment of the invention, the lead case will be a single origin of the known line or lines of cases that express that Point of Law. In circumstances such as discussed above, in which a single first opinion may not have been identified, one or more rules and/or heuristics, implemented automatically and/or manually, may serve to select a lead case. For example, the case expressing the Point of Law that came first in time may be designated the lead case. Alternatively, in an embodiment of the invention, the opinion at the origin of the most and/or longest chains of citations may be designated as the lead case.

In an embodiment of the invention, the designation of a lead case may depend on circumstances in which a lead case is required. For example, the first opinion in a particular jurisdiction to express a Point of Law may in an embodiment of the invention be considered the lead case in that jurisdiction, even though that opinion may itself cite another opinion, from another jurisdiction, e.g., as persuasive authority. Alternatively, in an embodiment of the invention, the first opinion of the highest court in a jurisdiction to express a Point of Law may be designated as the lead case in connection with that jurisdiction.

In an embodiment of the invention, more than one opinion may in some circumstances be designated together as lead cases in connection with one or more Points of Law.

In addition to or instead of designating one or more cases as lead cases, in an embodiment of the invention, opinions may be scored or otherwise evaluated, e.g., absolutely or relatively, as authority for one or more Points of Law. For example, opinions asserting a particular Point of Law may be ranked, e.g., according to the relative frequencies with which they are cited for that Point of Law. One such ranking, in an embodiment of the invention, may be derived by considering as a group all opinions that present a selected Point of Law and, for each opinion in the group, counting the other opinions in the group that cite the respective opinion.

For example, if some Point of Law is asserted in 50 opinions, each of those opinions may be assigned a score between zero and 49. To receive the maximum possible score of 49, an opinion would have to be cited by all 49 other opinions that assert the Point of Law. An opinion receiving a score of zero would not be cited by another other opinion asserting the Point of Law.

It will be appreciated that the scheme described above for ranking opinions that assert a particular Point of Law may be of more general applicability. In embodiments of the invention, documents that cite other documents may receive absolute or relative scores within a collection based on the number of other documents within the collection that cite each respective document. For example, each Web page that satisfies, e.g., a keyword-based query, may receive a score based on the number of other responsive pages that include hyperlinks to the scored page, and the relative or absolute scores may be used in an embodiment of the invention, e.g., to order the results of the search according to relevance.

As discussed earlier, a document such as, e.g., a legal brief, may cite authority, e.g., one or more judicial opinions, in support of statements in the document. It may in some circumstances be desirable to evaluate each cited reference in a document, e.g., to confirm that the cited reference stands for the proposition or propositions that it has been cited for and/or to ensure that the reference is still authority, which is to say that it has not subsequently been overruled or otherwise had is strength as precedent diminished.

Law may change over time. For example, statutes and/or regulations may be created, amended, and/or repealed from time to time. Independently, however, case law may change over time. For example, a court with sufficient authority may modify or overrule previous holdings, even settled ones. Courts create new precedents when they rule on questions of first impression. Older precedents, and/or the principles that they express, may fall into disuse or disfavor.

Thus, in reviewing a document, such as, e.g., a legal brief, it is sometimes desirable to review the citations and/or the authorities that they refer to. Such review may include, for example, trying to ensure that the citation designates the intended authority and/or that the authority does support the proposition that it is citied for.

Such review may also include, e.g., trying to ensure that the principle still holds that the reference has been cited for. For a legal brief, for example, this may include attempting to determine whether the relevant legal principle is still applicable in the relevant jurisdiction. In the course of such a review, moreover, authority may be found that, e.g., better supports the author's position than that currently cited.

Figure 4:
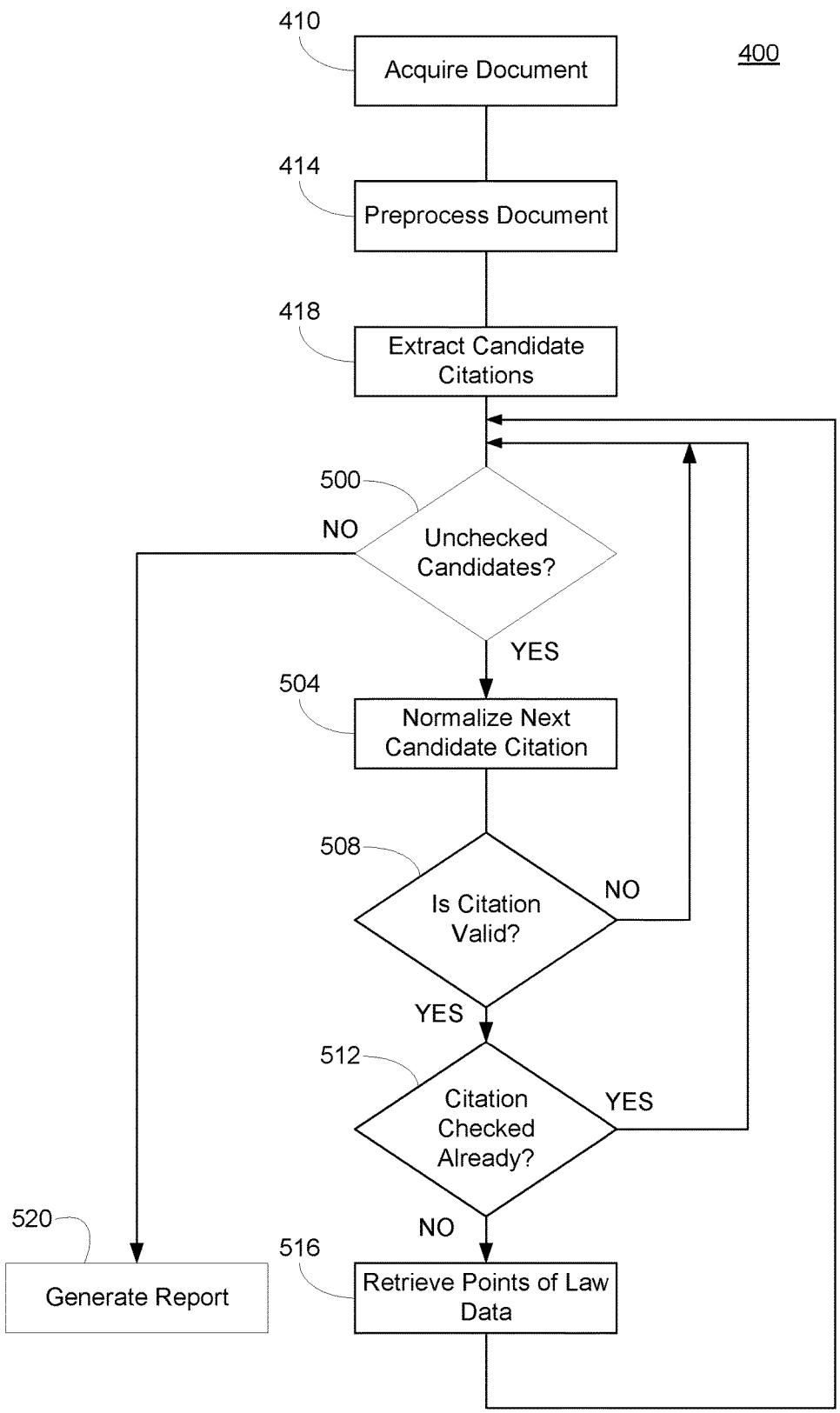
FIG. 4 depicts the flow of checking citations in a document according to an embodiment of the invention.

FIG. 4 depicts, from a high level, automated extraction of data (e.g., citations) from a document (e.g., a legal brief) and retrieval of information related to the citations and/or the cited authorities according to an embodiment of the invention. As depicted in FIG. 4, the process 400 begins in block 410 with acquisition of a document (or a representation of a document) in electronic form. For example, a document may, in connection with an embodiment of the invention be electronic to begin with, e.g., a file generated by a word processor or text editor. Acquisition of such a document may in an embodiment of the invention involve, e.g., copying a computer file from a computer-readable storage medium 166 (FIG. 1) associated with one computer system 140 (FIG. 1) to a medium associated with another, e.g., across one or more computer networks 180 (FIG. 2) and/or via one or more transportable computer-readable storage media.

Alternatively, in an embodiment of the invention, a hard copy of a document (e.g., a printed version) may be acquired and then an electronic representation of the document may be created, e.g., by scanning the document and storing the image or images resulting from the scan. Optical character recognition and/or related technology may then convert the images, e.g., to a textual representation of the document for further processing.

A document in connection with an embodiment of the invention may include one or more citations to one or more other documents. For example, in an embodiment of the invention intended for use with legal documents, a document acquired in block 410 may be, e.g., a brief or memorandum being drafted. The author of such a document may verify that the cited authorities provide effective support for the propositions that they are cited for. (Here, providing effective support may include supporting the proposition that they are cited for and/or continuing to be good law.) A judge or law clerk preparing a judicial opinion may similarly supply a draft opinion as the document in block 410.

Examination of a document in connection with an embodiment of the invention may also be critical. For example, the document supplied in block 410 may be, e.g., a brief submitted by a party's adversary or a judicial opinion that is partly or wholly adverse to a party. The examination in connection with an embodiment of the invention may in such circumstances be in preparation for drafting an answering brief or appealing the adverse decision.

Block 414 of FIG. 4 represents preprocessing an electronic document according to an embodiment of the invention. Preprocessing may in an embodiment of the invention comprise any one or more transformations of a document in preparation for, e.g., identifying citations in the document as discussed below. For example, preprocessing may comprise removal of metadata, formatting information, and/or other markup from a document. Preprocessing may also in an embodiment of the invention include, e.g., separating textual data for processing from, e.g., sound and/or still and/or moving images.

The nature of any preprocessing may depend, e.g., on the details of how an embodiment of the invention is implemented. In an embodiment of the invention, preprocessing of the electronic document may be omitted entirely.

In block 418, one or more patterns that may correspond to citations may be identified, e.g., automatically by one or more processors 145 (FIG. 1) executing instructions that make up one or more text processing engines, modules, and/or libraries (which may be referred to individually or collectively as a "text processor"). Standard forms exist for human-readable citations. Well-known standards are published by the Modern Language Association, the American Psychological Association, and the University of Chicago Press. Legal documents may adhere to the conventions described in *The Bluebook: A Uniform System of Citation* (Columbia Law Review Ass'n et al. eds., 17th ed. 2000) or Association of Legal Writing Directors, *ALWD Citation Manual: a Professional System of Citation* (Darby Dickerson ed., 2d ed. 2002).

Figure 6:
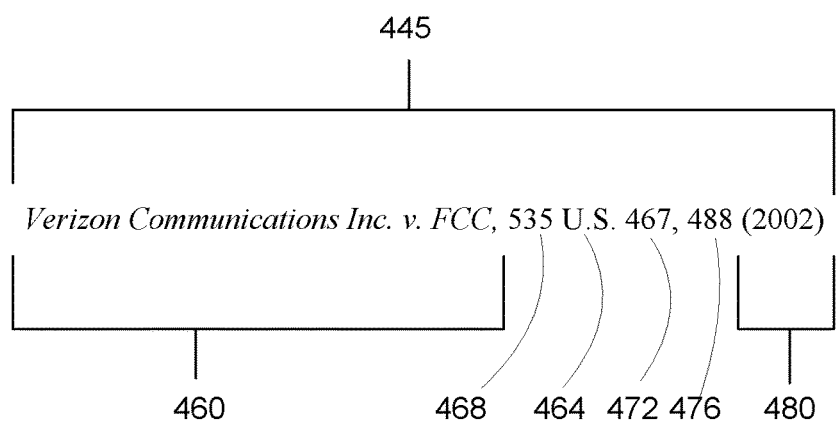
FIG. 6 is a citation found in the text of the document of FIG. 4.

FIG. 5 contains a fragment 440 of a document containing legal citations 445, 450 in a standard style. A case citation 445 refers to an opinion or other document issued by a court. FIG. 6 depicts the parts of the case citation 445. As depicted, the case citation 445 comprises a title 460, which often comprises the names of one or more parties to the action, an abbreviation 464 identifying the series of volumes (often called a "reporter") in which the opinion is published, the number 468 of the specific volume in which the opinion appears, and the first page 472 of the opinion within the volume. A court opinion is often cited as authority for a particular proposition of law, and a case citation 445 may therefore also comprise a "jump cite" 476 that indicates the page or pages on which the opinion provides that authority. A case citation 445 commonly also comprises the date 480 on which the court rendered the opinion.

The citation 445 that FIG. 6 depicts exemplifies a common pattern for citation forms that refer to published judicial opinions. The depicted citation 445 includes a number 468, which is a volume number, followed by a short series of alphanumeric characters and/or punctuation marks 464, which identifies a reporter, followed by one or more numbers 472, 476, which identify pages and/or ranges of pages.

Other information may appear in a case citation 445 in addition to and/or instead of the information depicted in FIG. 6. For example, when not clear from the identity of the reporter, the case citation 445 may indicate the court that rendered the cited opinion. For another example, if an opinion is published in more than one reporter, the case citation 445 may indicate the multiple publications by including "parallel citations" (not pictured).

The case citation 445 depicted in FIG. 6 is sometimes referred to as a "long form" citation. Abbreviated forms of citation (not pictured) exist and sometimes follow the long form citation when the same document is cited more than once in a document.

Standard forms exist for citing many other types of documents. Style manuals commonly prescribe long forms and abbreviated forms for citing nearly every type of document that a document might refer to.

Returning to FIG. 4, in an embodiment of the invention, in block 418, a text processor may identify candidate citations in the text of the electronic document, e.g., by identifying patterns in the text that may represent respective citations. One such pattern, according to an embodiment of the invention, may be as described above in connection with FIG. 6, e.g., a number, followed by a short series of alphanumeric characters and/or punctuation marks, followed in turn by one or more numbers.

Processing of the candidate citations in an embodiment of the invention may begin, e.g., in block 500 of FIG. 4, which represents determining whether there are in fact candidate citations remaining to check. If there are no candidate citations left to check, then the process 400 may end, e.g., in block 502, with generation and/or output, e.g., through an appropriate interface 153 (FIG. 1), of a report that may describe the results.

If candidate citations remain to be checked, in an embodiment of the invention, block 504 represents normalizing a candidate citation, which may comprise selecting one candidate citation and attempting to identify the document that it refers to. Identifying the referent of a citation may include, for example, one or more of comparing the series of alphanumeric characters to a table of, e.g., standard and variant names and abbreviations of reporters to identify the cited reporter, comparison of the first number in the citation to known volumes of the identified reporter, and/or comparing the page number or numbers to, e.g., an index relating page numbers in a volume to particular published opinions.

If a citation is a long form citation, e.g., as discussed above, the text processor may identify one or more additional parts of a citation in block 418, and block 504 may comprise, e.g., additional validation based on one or more of the parts. For example, the citation 445 in FIG. 6 includes a title 460. In an embodiment of the invention, validation in block 460 may include, e.g., comparing the title in a citation in the source document with a title of the document recorded in an index, thereby validating the form of source document's citation.

Returning to FIG. 4, in an embodiment of the invention, it is determined in block 408 whether a document has been identified that corresponds to the candidate citation in the source document. If not, the flow may return, e.g., to block 500 for processing of any remaining candidate citations. In an embodiment of the invention, if a pattern is found in block 504 that has the form of a valid citation but does not correspond to an actual document (e.g., because the citation includes a volume number that does not correspond to a published volume of the reporter, and/or the page number does not exist within the cited volume of the reporter), the candidate citation may be recorded, e.g., so that a message about the candidate may be included in the report discussed below.

In an embodiment of the invention, it may also be determined in block 512 that a previously-examined citation in the document refers to the same document as the current candidate citation refers to the same document. In that case, the flow may return, e.g., to block 500 for processing of any remaining candidate citations.

In an embodiment of the invention, if the current candidate citation is determined in block 512 not to have been encountered before in processing this document, block 516 represents retrieving Points of Law information related to the cited reference. Then, once it has been determined in block 500 that all candidate citations have been examined, in an embodiment of the invention, a report may be generated in block 520 that comprises the retrieved points of law information for all references cited in the document.

It will be appreciated that ordering and grouping of processing steps may vary in an embodiment of the invention. For example, in an embodiment of the invention and in contrast to the embodiment described above, all candidate citations may be found in the source document before any of the candidate citations is validated and/or normalized. In an embodiment of the invention, one or more iterative processes such as described above may identify all references that a document cites before any of the Points of Law information is retrieved.

In an embodiment of the invention, a report may provide information about some or all of the cited references. "Report" is used in a broad sense herein and may refer, e.g., to any collection of information about one or more of the references identified in a source document according to an embodiment of the invention. A report in an embodiment of the invention may, e.g., take the form of one or more electronic documents, which may include, e.g., text and/or images and/or other human- and/or machine-readable representations of information. Examples of formats of reports in embodiments of the invention may include, without limitation, text (with or without markup such as HTML), formats used by one or more word-processing programs, and/or the Adobe® Portable Document Format (PDF), among many possibilities.

FIG. 7 is an excerpt 550 from a legal brief such as may be used in connection with an embodiment of the invention. The excerpt 550 includes several citations, including a citation 555 to a 1985 opinion of the United States Court of Appeals for the Second Circuit and a citation 560 to a 1995 opinion of the Appellate Division of the New York State Supreme Court.

FIG. 8 is an entry 580 from a report that may be generated from analysis, e.g., of a document from which the text 550 of FIG. 7 has been excerpted, in an embodiment of the invention. A report according to an embodiment of the invention may comprise an entry, e.g., for each document cited at least once in the source document.

The entry 580 in FIG. 8 may begin with a citation 584 to reference to which this entry 580 applies. In an embodiment of the invention, the citation 584 may be, e.g., in a long form, e.g., including a title 588 that may help identify the case. In an embodiment of the invention, the citation 584 may be in, e.g., a normalized and/or standard form.

In an embodiment of the invention, a status indicator 592 may be presented, e.g., in proximity to the citation 584. A status indicator 592 may be a summary of the relative favorability or unfavorability of the treatment of the cited opinion by subsequent opinions that cite it. Citation indicators, such as may be used in connection with an embodiment of the invention, are described in more detail in commonly-owned pending U.S. patent application Ser. No. 12/140,381, filed 17 Jun. 2008 and titled "Embedded Composite Indicators of Document Status," which is incorporated herein by reference.

In an embodiment of the invention, an entry 580 may include analysis 596 of the treatment of the cited opinion by subsequent citing opinions. Such analysis 596 may be instead of or in addition to the composite indicator 592. For example, in an embodiment of the invention, subsequent citation of the opinion may be characterized, e.g., as following the holding of the opinion, distinguishing the facts in the subsequent cases from those involved in the opinion, or criticizing the holding of the opinion, among other possibilities.

Thus, for example, as FIG. 8 depicts, the entry 580 includes a citation analysis 596, which reports that the opinion of the Second Circuit in *Rothenberg* v. *Lincoln Farm Camp, Inc.* has been cited favorably 118 times. On one occasion, an opinion cited *Rothenberg* but distinguished itself from it.

In an embodiment of the invention, the entry 580 may also include a Points of Law Analysis section 600. For example, in the depicted embodiment, the entry 580 for each opinion may include all Points of Law that have been associated with the opinion. Alternatively, in an embodiment of the invention, fewer than all of the Points of Law may be included; for example, it may be possible to determine, e.g., from a jump cite in the source document, which Point or Points of Law the cited document is being cited to support. In such circumstances, the entry 580 for a case may include only the relevant Point or Points of Law.

In an embodiment of the invention such as FIG. 8 depicts, a Point of Law 604 in an entry 580 may comprise several pieces of information. For example, as depicted, as Point of Law 604 may include the normalized statement 608 of the legal principle. In connection with an embodiment of the invention a Point of Law 604 may be identified by a number and/or other code 612, which the report may include. The Point of Law 604 may also identify a lead case 616 associated with the Point of Law 604, e.g., as discussed above.

In an embodiment of the invention, Points of Law in an entry may be filtered, e.g., by jurisdiction, and such filter or filters may be selected manually or automatically (e.g., based on the jurisdiction from which one or more cited cases came).

A Point of Law 604 as presented in an entry 580 may identify one or more opinions in addition to or instead of one or more lead cases. For example, the Point of Law 604 may in an embodiment of the invention may include citations, e.g., to up to three opinions judged most useful and/or otherwise relevant to the Point of Law. For example, the three highest-ranked opinions (e.g., according to the ranking system discussed above) may be cited (not pictured) in the entry 580. In an embodiment of the invention, the collection of opinions asserting the Point of Law may be filtered, e.g., by jurisdiction, court, and/or subject matter, and the highest ranked of the remaining opinions may be cited.

In an embodiment of the invention, a Point of Law 604 in an entry 580 may be analyzed, e.g., to determine the current legal standing of the Point of Law. For example, in an embodiment of the invention such as FIG. 8 depicts, the Point of Law 604 may be accompanied by the results 620 of an analysis, which may comprise, for example, the recent citation history of the lead case; the lifetime citation history of the lead case; the recent citation history of the Point of Law; the lifetime citation history of the Point of Law; appellate court treatment of the point of law; negative treatment of underlying cases; the breadth of adoption of the Point of Law; a split between circuits of the United States Courts of Appeal; adoption of inconsistent legal standards by different jurisdictions; and the relative newness of the Point of Law.

It will be appreciated that the analysis may include one or more evaluations, one or more of which may be computed, e.g., by weighting one or more other factors, which are then analyzed in combination. In an embodiment of the invention, one or more of such factors may be the result, e.g., of comparing one or more metrics with preset values in one or more tables. For example, a Point of Law may in an embodiment of the invention be assigned one or more numerical scores between zero and five, inclusive, based on factors such as in Table 1 below.

TABLE 1

Default Ranges for Strength Indicators

| | | |
|---|---|---|
| 1) | Frequency of Citation of Cases Relying on the Point of Law (Lifetime Absolute Number) | |
| | 0 | Never cited |
| | 1 | 1 to 3 |
| | 2 | 4 to 11 |
| | 3 | 11 to 100 |
| | 4 | 101 to 500 |
| | 5 | 500 or more |
| 2) | Recent Citation History of Case Containing the Point of Law (Rolling Average, Effectively Based on Number of Cases that Support the Point of Law) | |
| | 0 | Never cited |
| | 1 | Cited, but not within the last 50 years |
| | 2 | Cited, but not within the last 25 years |
| | 3 | Cited, but not within the last 5 years |
| | 4 | Cited, but not within the last year |
| | 5 | Cited within the last year |
| 3a) | Lead Case Authority (State Lead Case) | |
| | 0 | Municipal or City Court |
| | 1 | Trial Court |
| | 2 | Intermediate Appellate Court |
| | 3 | Appellate Court |
| | 4 | Highest Court of State (e.g., New York Court of Appeals) |
| | 5 | U.S. Supreme Court |
| 3b) | Lead Case Authority (Federal Lead Case) | |
| | 0 | Bankruptcy Court Magistrate |
| | 1 | Bankruptcy Court |
| | 2 | Bankruptcy Appellate Panel (BAP) |
| | 3 | District Court |
| | 4 | Circuit Court |
| | 5 | U.S. Supreme Court |
| 4) | Negative Treatment | |
| | 0 | Underlying supporting case was reversed |
| | 1 | Underlying supporting case was overruled |

TABLE 1-continued

Default Ranges for Strength Indicators

|   |   |   |
|---|---|---|
| | 2 | Underlying supporting case was reversed in part, overruled in part, or modified |
| | 3 | Underlying supporting case was affected by statute or criticized |
| | 4 | Underlying supporting case was distinguished |
| | 5 | No negative treatment in any citation |
| 5) | Breadth of Adoption | |
| | 0 | 1 jurisdiction |
| | 1 | 2 jurisdictions |
| | 2 | 3-5 jurisdictions |
| | 3 | 6-10 jurisdictions |
| | 4 | 11-25 jurisdictions |
| | 5 | More than 25 jurisdictions |
| 6) | "Stall Indicator" | |
| | Y/N | Citation frequency after negative treatment was less than the frequency before the negative treatment |
| 7) | Mean Frequency (relative to all Points of Law) | |
| | 1 | 15% or more below mean frequency |
| | 2 | 5-15% below mean frequency |
| | 3 | Within 5% of mean frequency |
| | 4 | 5-15% above mean frequency |
| | 5 | 15% or more above mean frequency |

In an embodiment of the invention, one or more of the ranges may vary, depending, e.g., on the court that issued the lead case or other opinion expressing the Point of Law. For example, the most-cited opinions of the Supreme Court of the United States may be cited many more times than even heavily-cited opinions of other courts. Thus, in an embodiment of the invention, a greater range of values for, e.g., Frequency of Citation, may be permitted for opinions of the Supreme Court than for, e.g., opinions of state trial courts.

The weightings and ranges in Table 1 may reflect, e.g., default preferences and assumptions regarding the relative importance of various attributes of an opinion. For example, in an embodiment of the invention, one or more such tables and/or other rules or standards for use in evaluating a Point of Law may be provided, e.g., as a default setting from an application service provider. In an embodiment of the invention, one or more such default settings may be changed in an embodiment of the invention for individual users and/or groups of users, e.g., to reflect differing judgments about the relative importance of various factors and/or appropriate criteria for rating Points of Law. Means for making such changes include those known in the art, and may comprise, for example, one or more configuration files and/or user interface elements included, e.g., by an application.

Various factors may be used in an embodiment of the invention to evaluate individual opinions in terms of the strength that they may offer for a particular Point of Law. For example, the ranking of opinions based on relative citation frequency, e.g., as discussed above, may provide an evaluation or ranking, which may be independent of subjective preferences or assumptions. It will be apparent that various factors, including, e.g., some of those listed in Table 1, above, may provide another basis for evaluating or ranking opinions, and that such considerations and/or their weightings may be changed, e.g., to reflect users' subjective preferences or assumptions.

An evaluation or ranking such as discussed above may be included for some or all opinions cited in a report according to an embodiment of the invention. For example, in an embodiment of the invention, some or all citations in the report may be associated, e.g., with an indication of the strength of the opinion. The indication may be, e.g., qualitative, with a symbol and/or color code adjacent to the citation, or may be quantitative, e.g., as an absolute and/or relative numerical score presented adjacent to the citation. Other forms in which the information may be conveyed are possible and may include forms and methods well known in the relevant arts.

The invention claimed is:

1. A computer system for providing information related to references cited in a source document, the computer system comprising:
   one or more processors;
   a memory operatively coupled to at least one of the processors;
   an interface operatively coupled to at least one of the processors;
   a database operatively coupled to at least one of the processors; and
   a computer-readable storage medium, operatively coupled to at least one of the processors and encoded with instructions that, when executed by at least one of the processors, cause the computer system at least to:
   preprocess a plurality of documents based on a selection criterion;
   select the source document from the plurality of preprocessed documents;
   storing the source document in the memory;
   identify in the source document a citation to a cited document, the cited document being a legal opinion;
   retrieve from the database at least one normalized expression of a previously identified legal principle expressed in the cited document, where the at least one normalized expression is a substantive expression of the previously identified principle in a standard form and the previously identified legal principle being associated with one of any statement, interpretation, analysis, or standard of law expressed in the legal opinion, the normalized expression being absent from both the source document and the cited document, such that statements in other legal opinions relating to the previously identified legal principle may be described in terms of the at least one normalized expression and the retrieval of which from the database is independent from any document that contains the normalized expression;
   store in the memory strength information representing a level of precedent set by the normalized expression; and
   output through the interface a report comprising the normalized expression and indicia that the normalized expression relates to the cited document, wherein the report comprises the strength information, which is associated in the report with the normalized expression.

2. The computer system of claim 1 wherein the at least one normalized expression is one of a plurality of normalized expressions wherein each normalized expression of the plurality of normalized expressions shares a relationship with one or more other normalized expressions of the plurality of normalized expressions.

3. The computer system of claim 1 wherein the computer system is further caused to preprocess the plurality of documents by separating textual data for processing from non-textual data in each document of the plurality of documents.

4. The computer system of claim 3 wherein the non-textual data includes at least one of sound, still images, and moving images.

5. The computer system of claim 1 wherein the selection criterion is based on a quality of writing.

6. A method of providing information related to references cited in a source document using a computer system comprising one or more processors, a memory operatively coupled to at least one of the processors, an interface operatively coupled to at least one of the processors, and a database operatively coupled to at least one of the processors, the method comprising:
   preprocessing a plurality of documents based on a selection criterion;
   selecting the source document from the plurality of preprocessed documents;
   storing the source document in the memory;
   automatically identifying in the source document a citation to a cited document, the cited document being a legal opinion;
   retrieving from the database at least one normalized expression of a previously identified legal principle expressed in the cited document, where the at least one normalized expression is a substantive expression of the previously identified principle in a standard form and the previously identified legal principle being associated with one of any statement, interpretation, analysis, or standard of law expressed in the legal opinion, the normalized expression being absent from both the source document and the cited document, such that statements in other legal opinions relating to the previously identified legal principle may be described in terms of the at least one normalized expression and the retrieval of which from the database is independent from any document that contains the normalized expression;
   storing in the memory strength information representing a level of precedent set by the normalized expression; and
   outputting through the interface a report comprising the normalized expression and indicia that the normalized expression relates to the cited document, wherein the report comprises the strength information, which is associated in the report with the normalized expression.

7. The method of claim 6 wherein the at least one normalized expression is one of a plurality of normalized expressions and shares a relationship with one or more other normalized expressions of the plurality of normalized expressions, wherein the relationship involves one or more parts of a multi-part test expressed in the legal opinion.

8. The method of claim 6 wherein preprocessing a plurality of documents further comprises:
   separating textual data for processing from non-textual data in each document of the plurality of document.

9. The method of claim 8 wherein the non-textual data includes at least one of sound, still images, and moving images.

10. The method of claim 6 wherein the selection criterion is based on a quality of writing.

11. A non-transitory computer-readable storage medium encoded with instructions for providing information related to references cited in a source document that, when executed by one or more processors in a computer system that comprises a memory operatively coupled to at least one of the processors, an interface operatively coupled to at least one of the processors, and a database operatively coupled to at least one of the processors, causes the computer system at least to:
   preprocessing a plurality of documents based on a selection criterion;
   selecting the source document from the plurality of preprocessed documents;
   store the source document in the memory;
   automatically identify in the source document a citation to a cited document, the cited document being a legal opinion;
   retrieve from the database at least one normalized expression of a previously identified legal principle expressed in the cited document, where the at least one normalized expression is a substantive expression of the previously identified principle in a standard form and the previously identified legal principle being associated with one of any statement, interpretation, analysis, or standard of law expressed in the legal opinion, the normalized expression being absent from both the source document and the cited document, such that statements in other legal opinions relating to the previously identified legal principle may be described in terms of the at least one normalized expression and the retrieval of which from the database is independent from any document that contains the normalized expression;
   store in the memory strength information representing a level of precedent set by the normalized expression; and
   output through the interface a report comprising the normalized expression and indicia that the normalized expression relates to the cited document, wherein the report comprises the strength information, which is associated in the report with the normalized expression.

12. The non-transitory computer-readable storage medium of claim 11 wherein the at least one normalized expression is one of a plurality of normalized expressions wherein each normalized expression of the plurality of normalized expressions shares a relationship with one or more other normalized expressions of the plurality of normalized expressions, and the instructions cause the computer system to further:
   store the shared relationship shared by each normalized expressions with the one or more other normalizes expressions in the memory.

13. The non-transitory computer-readable storage medium of claim 11 wherein the computer system in preprocessing the plurality of documents is further caused to separate textual data for processing from non-textual data in each document of the plurality of documents.

14. The non-transitory computer-readable storage medium of claim 13 wherein the non-textual data includes at least one of sound, still images, and moving images.

15. The non-transitory computer-readable storage medium of claim 11 wherein the selection criterion is based on a quality of writing.

* * * * *